United States Patent
Tanakala et al.

(10) Patent No.: US 12,469,031 B2
(45) Date of Patent: Nov. 11, 2025

(54) TERMINAL ENABLED UNBANKED CHECK PROCESSING

(71) Applicant: Digital First Holdings LLC, Atlanta, GA (US)

(72) Inventors: Bhagavanthulu Veera Venkata Tanakala, Dunwoody, GA (US); Lalitha Rashmi Bhairy, Dunwoody, GA (US); Brennan Paul Day, Augusta, GA (US)

(73) Assignee: Digital First Holdings LLC, Atlanta, GA (US)

( * ) Notice: Subject to any disclaimer, the term of this patent is extended or adjusted under 35 U.S.C. 154(b) by 41 days.

(21) Appl. No.: 17/994,644

(22) Filed: Nov. 28, 2022

(65) Prior Publication Data

US 2024/0177156 A1 May 30, 2024

(51) Int. Cl.
*G06Q 20/40* (2012.01)
*G06Q 20/10* (2012.01)

(52) U.S. Cl.
CPC ........... *G06Q 20/401* (2013.01); *G06Q 20/10* (2013.01)

(58) Field of Classification Search
CPC .............................. G06Q 20/401; G06Q 20/10
See application file for complete search history.

(56) References Cited

U.S. PATENT DOCUMENTS

| | | | |
|---|---|---|---|
| 2002/0184152 A1* | 12/2002 | Martin | G06Q 40/00 705/45 |
| 2013/0020172 A1* | 1/2013 | Cha | G07D 11/14 194/206 |
| 2017/0003856 A1* | 1/2017 | Mande | G06Q 10/20 |
| 2023/0060464 A1* | 3/2023 | Ceesay | G06Q 20/042 |

* cited by examiner

*Primary Examiner* — Scott S Trotter
(74) *Attorney, Agent, or Firm* — Schwegman Lundberg & Woessner, P.A.

(57) ABSTRACT

A transaction terminal presents a new type of transaction through the transaction interface for cashing checks of unbanked consumers. The interface obtains a government identifier provided through input and/or government issued card read at the terminal. The check is imaged, and the government identifier is verified by a government verification service. Once verified, a name associated with the government identifier obtained from the verification service is matched to a payee name on the check obtained from an image of the check. The bank that the check is drawn on is provided the check account number and amount of the check and returns an authorization code when the check is authorized to be cashed. The authorization code is provided to the terminal and the terminal dispenses currency in the amount of the check to the unbanked consumer.

12 Claims, 4 Drawing Sheets

TERMINAL ENABLED UNBANKED CHECK PROCESSING

BACKGROUND

There are millions of people who do not have a bank account for a variety of reasons. These individuals receive paychecks for work or checks for goods they sell in the form of checks rather than through conventional direct account deposit. They may also receive checks for tax refunds, withdrawals from their retirement, selling stock, etc.

Most banks do not permit checks to be cashed by individuals who lack an account with the bank where the check is being presented for cashing. Additionally, automated teller machines (ATMs) do not permit individuals to cash a check without the individual presenting the check having an account with the bank associated with the ATM. The ATMs only permit checks to be deposited to an account associated with a different bank and will not allow the check to be cashed for currency at the ATM. Furthermore, it is not just banks that refuse to cash checks of an unbanked individual, as grocery and retail stores do not permit these checks to be cashed.

SUMMARY

In various embodiments, methods and a system for terminal enabled unbanked check processing are presented. A new transaction type for cashing an unbanked consumer's check at a terminal is provided. An enhanced check cashing workflow of the terminal is provided to process the new transaction type and a transaction interface of the terminal is enhanced for cashing the unbanked consumer's check. A network-based service is provided that verifies a government card identity of an unbanked consumer, verifies a check payee name matches a name on the government card, obtains authorization from the bank that the check is drawn on, and provides the authorization to the terminal for cashing the check at the terminal on behalf of the unbanked consumer.

DETAILED DESCRIPTION

Figure 1:
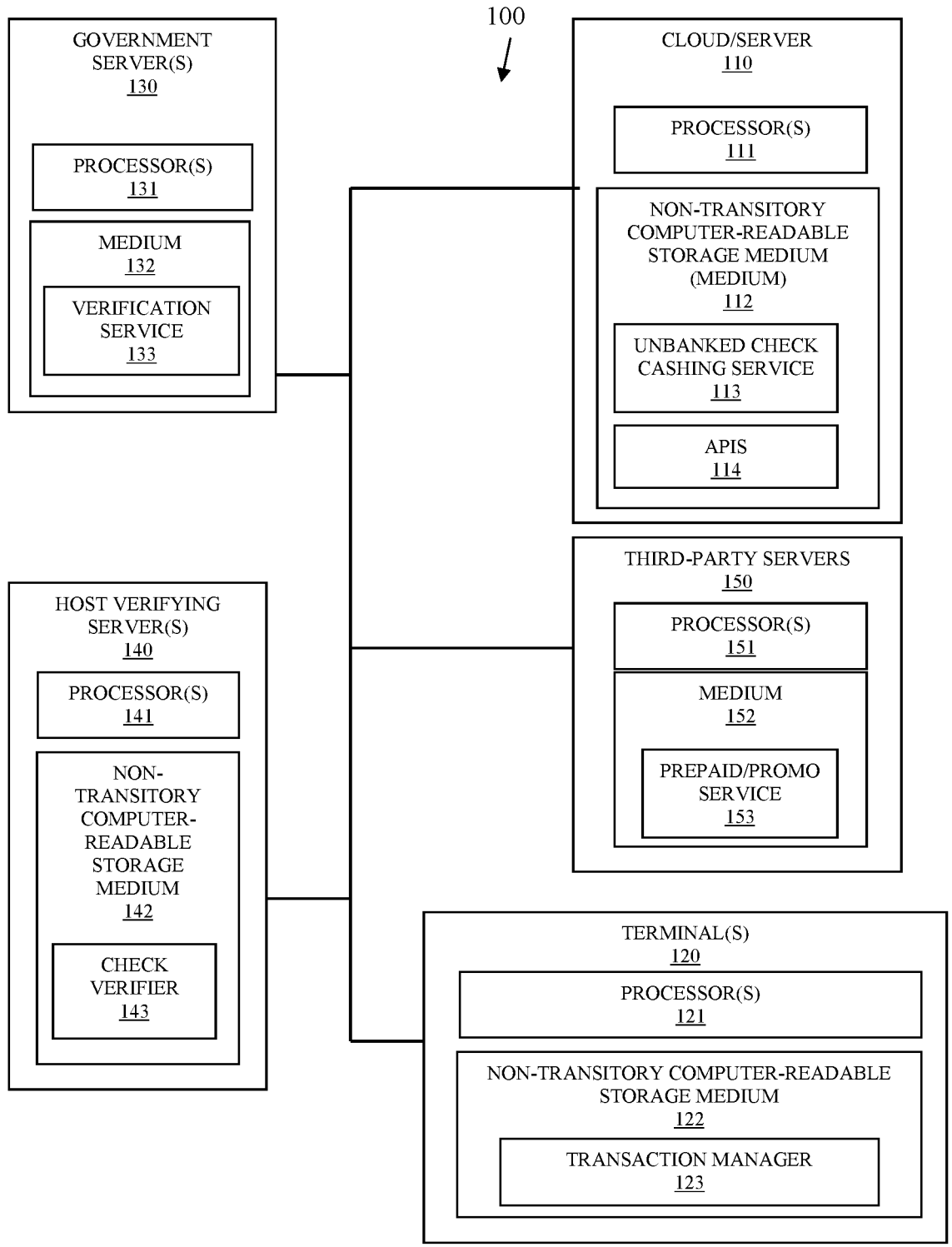
FIG. 1 is a diagram of a system for terminal enabled unbanked check processing, according to an example embodiment.

The risk associated with cashing a check for an unbanked individual is believed to be too high and as a result unbanked individuals are forced to use cash checking services to cash their checks. Cash checking services are notorious for charging exorbitant fees even though such services are now heavily regulated. The services largely still exist because of the high number of unbanked individuals and because banks and retailers refuse to assume risks associated with cashing unbanked checks.

Additionally, the cash checking services typically have to be visited in person by the unbanked individual and because of recent regulations the availability of stores for these services is extremely limited. Consequently, it is expensive, inconvenient, and difficult for unbanked individuals to survive without bank accounts Unbanked individuals face high check cashing fees and inconvenience when they need to cash a check. Banks and ATMs currently lack the technological means to mitigate risks associated with cashing unbanked checks such that unbanked individuals are forced to cash their checks at cash checking stores, which have restrictive business hours and restrictive store locations.

These issues are solved with the techniques presented herein and below. An unbanked network service is called from an enhanced check-cashing workflow of a terminal. Moreover, an enhanced terminal user interface is provided to facilitate processing of a new type of transaction at the terminal. The new type of transaction permits an unbanked consumer to present a government issued identification card at the terminal along with a check that is to be cashed at the terminal. The consumer's identifying information from the card is verified with a corresponding government entity server and the check information from the check is scored based on interaction with the bank that the check is drawn on. Assuming the government verification and the score are acceptable, an authorization from the bank the check is drawn on is provided to the terminal and currency for the check is dispensed to the consumer. In an embodiment, the consumer can elect to take a portion or all of the check proceeds as a virtual prepaid card that is printed and dispensed to the consumer at the terminal.

By enhancing a terminal's interface and a check cashing workflow, banks associated with the terminal can provide services to unbanked consumers that permit the unbanked consumers to cash checks at terminals of the banks. This allows the banks to collect fees from non-customers during the check cashing, allows the banks to market their services to these non-customers during the check cashing, and allows potential partnerships between banks and retailers for prepaid and promotional services pitched to these non-customers during the check cashing. At the same time, the unbanked consumers or non-banked consumer benefit with substantially lower check cashing fees and with the convenience of cashing their checks at any time and from any location where the terminals are available. A non-banked consumer is someone who may or may not have a bank account at a bank but do not have an account at the bank where they are utilizing the ATM.

FIG. 1 is a diagram of a system 100 for terminal enabled unbanked check processing, according to an example embodiment. The system 100 is shown schematically in greatly simplified form, with only those components relevant to understanding of one or more embodiments (represented herein) being illustrated. The various components are illustrated, and the arrangement of the components is presented for purposes of illustration only. It is to be noted that other arrangements with more or less components are possible without departing from the terminal enabled unbanked check processing presented herein and below.

Moreover, various components are implemented as one or more software modules, which reside in non-transitory storage and/or hardware memory as executable instructions that when executed by one or more hardware processors perform the processing discussed herein and below.

As used herein the phrase "unbanked consumer" is intended to mean an individual that lacks a bank account or an individual that is unwilling to provide a bank account when cashing a check made out to the individual. So, an unbanked consumer can be someone that is unbanked or someone that refuses to disclose their bank account for verification purposes during a check cashing transaction at a terminal.

System 100 includes a cloud 110 or a server 110 (hereinafter referred to as "cloud 110"), one or more terminals 120, one or more user-government servers 130, one or more host verifying servers 140, and one or more third-party provider servers 150 (hereinafter just "provider server 150"). Cloud 110 includes at least one processor 111 and a non-transitory computer-readable storage medium (hereinafter "medium") 112, which includes executable instructions for an unbanked check cashing service 113 and application programming interfaces (APIs) 114. The instructions when provided to processor 111 cause processor 111 to perform operations discussed herein and below for 113-114.

Each terminal 120 includes at least one processor 121 and medium 122, which includes executable instructions for a transaction manager 123. The instructions when provided to processor 121 cause processor 121 to perform operations discussed herein and below for 123.

Each government server 130 comprises one or more processors 131 and medium 132, which includes executable instructions for a verification service 133. When the executable instructions are provided to processor 131, this causes processor 131 to perform operations discussed herein and below 133.

Each host verifying server 140 includes at least one processor 141 and a non-transitory computer readable storage medium 142, which includes instructions for a check verifier 143. When the executable instructions are provided to corresponding processor 141, this causes processor 141 to perform operations discussed herein and below for 143.

Each provider server 150 includes at least one processor 151 and a non-transitory computer readable storage medium 152, which includes instructions for a prepaid/promo service 153. When the executable instructions are provided to corresponding processor 151, this causes processor 151 to perform operations discussed herein and below for 153.

A conventional workflow associated with cashing a check at a terminal includes the consumer presenting the check verifying their identity to an account with a bank. There is no existing workflow processed on terminals whereby this process of authenticating to an identity associated with a bank account can be bypassed.

The conventional workflow and conventional transaction user interface of a conventional terminal is enhanced with the teachings presented herein by system 100, method 200, and method 300. A transaction interface of transaction manager 123 is enhanced to include a new transaction type associated with cashing a check at a terminal 120 for an unbanked consumer.

When a consumer selects the new transaction type option from the enhanced transaction interface of transaction manager 123, an enhanced workflow is processed by transaction manager 123. Transaction manager 123 requests that the consumer insert or scan a government-issued identification card, such as a passport, a driving license, etc. Transaction manager 123 reads the card information from the identification card inserted or scanned by the terminal 120 and requests that the consumer insert the check to be cashed through the enhanced transaction interface. The check is inserted into a media infeed of the terminal 120. The existing media handling modules of the terminal 120 image the check front and back and read any magnetic ink character recognition (MICR) line encoded on the check. The MICR line when provided includes the bank routing number, customer account number, a customer check number for the bank upon which the check is drawn.

Transaction manager 123 process an enhanced modified check cashing workflow based on the unbanked transaction type selected by the consumer at the terminal 120 for purposes of sending the card information read for the government identification card, the front and back images of the check, and any MICR information read from the check to unbanked check cashing service 113. Service 113 verifies the consumer's identity by using the identification card information to identify the appropriate government server 130 and sending the consumer identity and card information to the verification service 133 of that government server 130. For example, government identification card information for an Atlanta driver's license is magnetically encoded and/or encoded via a barcode/quick response (QR) code with information that identifies the government issuing authority, which would be the Atlanta Department of Motor Vehicles. This permits unbacked check cashing service 113 to identify the public provided server 130 associated with verifying an Atlanta driver's license and use an API 114 to provide additional consumer information also encoded on the card, such as consumer name, consumer address, consumer driver's license number, issue date of driver's license, expiration date of driver's license, date of birth, etc. The verification service 133 returns a message via API 114 that authenticates the card or does not authenticate the card.

Assuming the government issued card is verified as authenticate by the corresponding verification service 133, unbanked check cashing service can use optical character recognition (OCR) to identify the name that the check is bade out to using a front image of the check and can compare the check name of the payee to the consumer name associated with the government identification card. When the names do not match, unbanked check cashing service 113 sends a denial back to transaction manager 123 and manager 123 causes the media peripherals to eject the check back out to the consumer and display a message through the transaction interface that the check cannot be cashed because the name on the check does not match the name on the government identification card.

Assuming, the name on the check matches the name on the authenticated government identification card, unbanked check cashing service 113 uses OCR to obtain the check amount written or printed on the check and uses the MICR information to identify the host bank or host verifying server 140. The account number of the MICR information and the amount of the check is then sent by unbanked check cashing service 113 using an API 114 to the host bank's check verifier along with the images of the check. The unbanked check cashing service 113 may also send additional information to the check verifier, such as terminal identifier for the terminal and bank identifier for the bank associated with the terminal. Check verifier 143 verifies that the account number associated with the check exists with the host bank and that the account has sufficient funds to cover the amount of the check. If the check verifier 143 fails to provide verification, then unbanked check cashing service 113 sends a declination message back to transaction manager 123 and displays a message to the consumer that the checking account of the check is unable to be verified and/or the account lacks sufficient funds to cash the check. Transaction manager 123 causes the media peripherals to eject the check back to the consumer and the check cashing is denied.

Assuming, the check verifier 143 verifies the account of the check exists and that the account has a balance of funds sufficient to cover the amount of the check, check verifier 143 sends an authorization code or message back to unbanked check cashing service 113. Unbanked check cashing service sends the authorization code directly to transaction manager 123. Based on the authorization code, the transaction manager causes the media peripherals to store the check in a check cassette bin of terminal 120 and instructs the media cassettes to dispense the cash in the amount of the check to the consumer at the terminal 120. In an embodiment, the authorization code from the check verifier also includes the amount of the check.

Once the identity of the consumer is confirmed with the appropriate government server 130, the checking account and amount of the check is verified by the appropriate host server 140, and the authorization code is sent by unbanked check cashing service 113 to transaction manager 123 a variety of additional embodiments can be processed through transaction manager 123 and provider servers 150 and their prepaid/promo services 153.

For example, transaction manager 123 may display through the transaction interface a message to the customer indicating that the check was authorized to be cashed in the check amount, but the bank associated with terminal 120 accesses a fee of a set amount to cash the check. If the consumer declines the fee, the check is ejected back through the media peripherals to the consumer. It is noted that this fee requirement can be presented within the transaction interface before transaction manager 123 initially interacts with unbanked check cashing service 113 such that no authorization is yet obtained by transaction manager when the check is ejected if the customer rejects the check cashing fee.

In an embodiment, transaction manager 123 may display a variety of options to the consumer once the check is authorized to be cashed through the transaction interface. For example, one option may be for the consumer to use a portion of the check amount or all of the check amount to purchase a prepaid card with a provider. The card amount and card details, if selected, are printed on a receipt that is dispensed to the consumer.

In an embodiment, transaction manager 123 maintains a ledger for any selected prepaid cards and the amounts for reconciling with the corresponding prepaid/promo service 153. In an embodiment, transaction manager 123 interacts with each prepaid/promo service 152 to obtain the card information and provide a transfer of funds associated with the check amount to pay for the prepaid card.

In an embodiment, promotional offers may also be presented to the consumer once the check is authorized to be cashed. For instance, transaction manager 123 may display an offer of $100 if the consumer signs up for an account with a given provider for direct deposits. The given provider may be the bank associated with terminal 120. As another example, a retailer may offer a coupon for buy one get one of a product, if the consumer accepts the offer, transaction manager 123 causes the promotion to be printed on another receipt through a receipt printer of terminal 120.

In an embodiment, transaction manager 123 permits printing of prepaid cards via the receipt printer and printing of promotional offers from the receipt printer based on selections made from the transaction interface by the consumer after the check is authorized for cashing. Transaction manager 123 causes the media cassettes to dispense currency associated with the check amount less any prepaid card amounts selected by the consumer.

In an embodiment, the transaction interface is enhanced to accept a government identifier from the unbanked consumer; for example, a driver's license. In this embodiment, the unbanked consumer may not have to provide the driver's license; rather unbanked check cashing service 113 identifies the format of the driver's license as confirming to a specific state Department of Motor Vehicles, contacts the corresponding verification service 133, and receives back the name associated with the driver's license number and an authorization of a valid or invalid driver's license. Assuming a valid driver's license, service 113 compares the name associated with the driver's license against the payee name on the check and verifies the unbanked consumer identity based thereon. It is noted that other types of government-issued identifiers may also be used through the transaction interface such as a social security number of the unbanked consumer.

In an embodiment, the transaction interface is enhanced to accept a government identifier from the unbanked consumer and the unbanked consumer is also required to enter or scan a government issued card. Service 113 uses both the entered government identifier and the card information from the government issued card to verify the identity of the unbanked consumer.

One now appreciates how a cloud-based service 113 can be provided along with enhanced to existing check cashing workflows of terminals 120 and the corresponding transaction interfaces to reduce risk associated with cashing an unbanked consumer's check and permit cashing of the unbanked consumer's check. In addition, the banks associated with the terminals 120 can enhance revenues through unbanked check cashing fees and partnerships with providers of prepaid cards and promotions. Still further banks can pitch enrolling the unbanked consumer to an account with the bank during the check cashing at the terminal 120. Unbanked consumers now have convenient and substantially less costly means to cash checks since terminals are pervasive and many of the terminals are available 24-7 to the consumers.

In an embodiment, the terminal 120 includes an automated teller machine (ATM), a self-service terminal (SST), a point-of-sale (POS) terminal, or a kiosk. In an embodiment, the unbanked check is a government issued check, a company issued check, or a personal check.

Figure 2A:
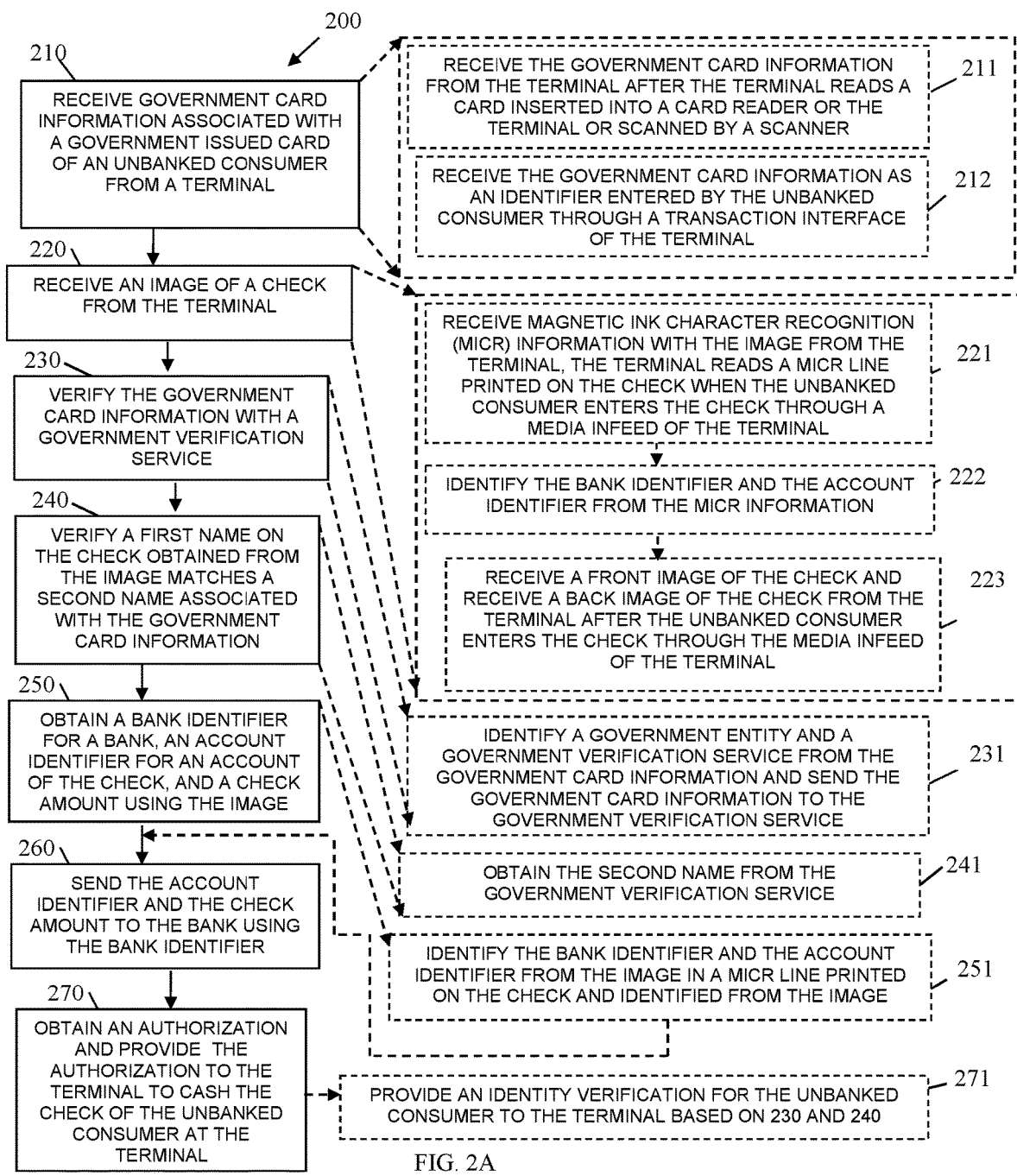
FIG. 2A is a diagram of a method for terminal enabled unbanked check processing, according to an example embodiment.
Figure 2B:
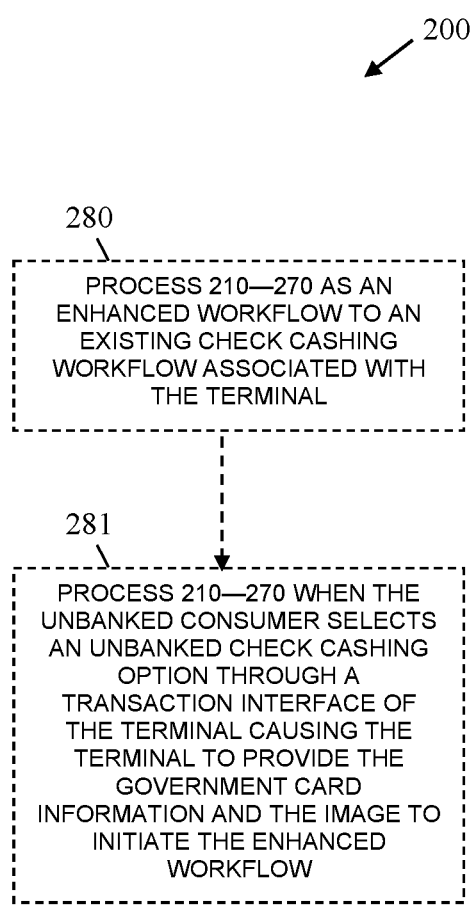
FIG. 2B is a diagram of additional embodiments of the method of FIG. 2A.

The embodiments of FIG. 1 and other embodiments are now discussed with reference to the FIGS. 2A, 2B, and 3. FIGS. 2A and 2B are diagrams of a method 200 for terminal enabled unbanked check processing, according to an example embodiment. The software module(s) that implements the method 200 is referred to as an "unbanked check cashing service." The unbanked check cashing service is implemented as executable instructions programmed and residing within memory and/or a non-transitory computer-readable (processor-readable) storage medium and executed by a plurality of hardware processors of a plurality of hardware computing devices. The processors of the devices that execute the unbanked check cashing service are specifically configured and programmed to process the unbanked check cashing service. The unbanked check cashing service has access to one or more networks during its processing. The networks can be wired, wireless, or a combination of wired and wireless.

In an embodiment, the device that execute the unbanked check cashing service is cloud 110 or server 110. In an embodiment, the unbanked check cashing service is unbanked check cashing service 113 and/or APIs 114.

At 210 (shown in FIG. 2A), the unbanked check cashing service receives government card information associated with a government issued card of an unbanked consumer. The information can be entered through a transaction interface and/or read from a government issued card at the terminal 120.

For example, and in an embodiment, at 211 (shown in FIG. 2A), the unbanked check cashing service receives the government card information from the terminal 120 after the terminal 120 reads a card inserted into a card reader peripheral or scanned by a scanner peripheral of the terminal 120. In an embodiment of 210 and/or 211, at 212 (shown in FIG. 2A), the unbanked check cashing service receives the government card information as an identifier entered by the unbanked consumer through a transaction interface of the terminal 120.

At 220 (shown in FIG. 2A), the unbanked check cashing service receives an image of the check from the terminal 220. The image is captured when the check is inserted into a media depository peripheral of the terminal 120 through a media infeed of the terminal 120.

In an embodiment, at 221 (shown in FIG. 2A), the unbanked check cashing service receives MICR information with the image from the terminal 120. The terminal 120 reads a MICR line printed on the check when the unbanked consumer enters the check through a media infeed of the terminal 120.

In an embodiment of 221 and at 222 (shown in FIG. 2A), the unbanked check cashing service identifies a bank identifier for a bank that the check is drawn on and an account identifier for an account of the check from the MICR information. In an embodiment of 222 and at 223 (shown in FIG. 2A), the unbanked check cashing service receives a front image of the check and a bank image of the check from the terminal 120 after the unbanked consumer enters the check through the media infeed of the terminal 120. In an embodiment, the unbanked check cashing service verifies that the back of the check was endorsed by the payee or the unbanked consumer from the back image of the check.

At 230 (shown in FIG. 2A), the unbanked check cashing service verifies the government card information with a government verification service 133. The government verification service 133 can return a name associated with the government card information and an indication as to whether the card information is active and valid for the name.

In an embodiment, at 231 (shown in FIG. 2A), the unbanked check cashing service identifies a government entity and the government verification service 133 from the government card information. The unbanked check cashing service sends the government card information to the government verification service 133 for verification.

At 240 (shown in FIG. 2A), the unbanked check cashing service verifies a first name on the check obtained from the image matches a second name associated with the government card information. In an embodiment, at 241 (shown in FIG. 2A), the unbanked check cashing service obtains the second name from the government verification service 133.

At 250 (shown in FIG. 2A), the unbanked check cashing service obtains a bank identifier for a bank that the check is drawn, an account identifier for an account associated with the check, and a check amount using the image of the check. In an embodiment, at 251 (shown in FIG. 2A), the unbanked check cashing service identifies the bank identifier and the account identifier from the image of the check in a MICR line printed on the check and identified from the image of the check.

At 260 (shown in FIG. 2A), the unbanked check cashing service sends the account identifier and the check amount to the bank using the bank identifier to identify the bank server or host server 140. In an embodiment, an image of the check is also provided to the bank server for verification with the account and the amount of the check.

At 270 (shown in FIG. 2A), the unbanked check cashing service obtain an authorization from the bank or a check verification service 143 of the bank. The unbanked check cashing service provides the authorization to the terminal 120 to cash the check of the unbanked consumer at the terminal 120.

In an embodiment, at 271 (shown in FIG. 2A), the unbanked check cashing service provides an identity verification for the unbanked consumer to the terminal 120 based on 230 and 240. That is, the unbanked check cashing service provides both the identity verification determined by the unbanked check cashing service and the authorization determined by the bank to the terminal 120. The terminal 120 retains both as an audit log associated with cashing the unbanked check at the terminal 120.

In an embodiment, at 280 (shown in FIG. 2B), the unbanked check cashing service is processed as an enhanced workflow to an existing check cashing workflow associated with the terminal 120. In an embodiment of 280 and at 281 (shown in FIG. 2B), the unbanked check cashing service processes at 210 when the unbanked consumer selects an unbanked check cashing option through a transaction interface of the terminal 120 causing the terminal 120 to provide the government card information and the image of the check to initiate the enhanced workflow.

Figure 3:
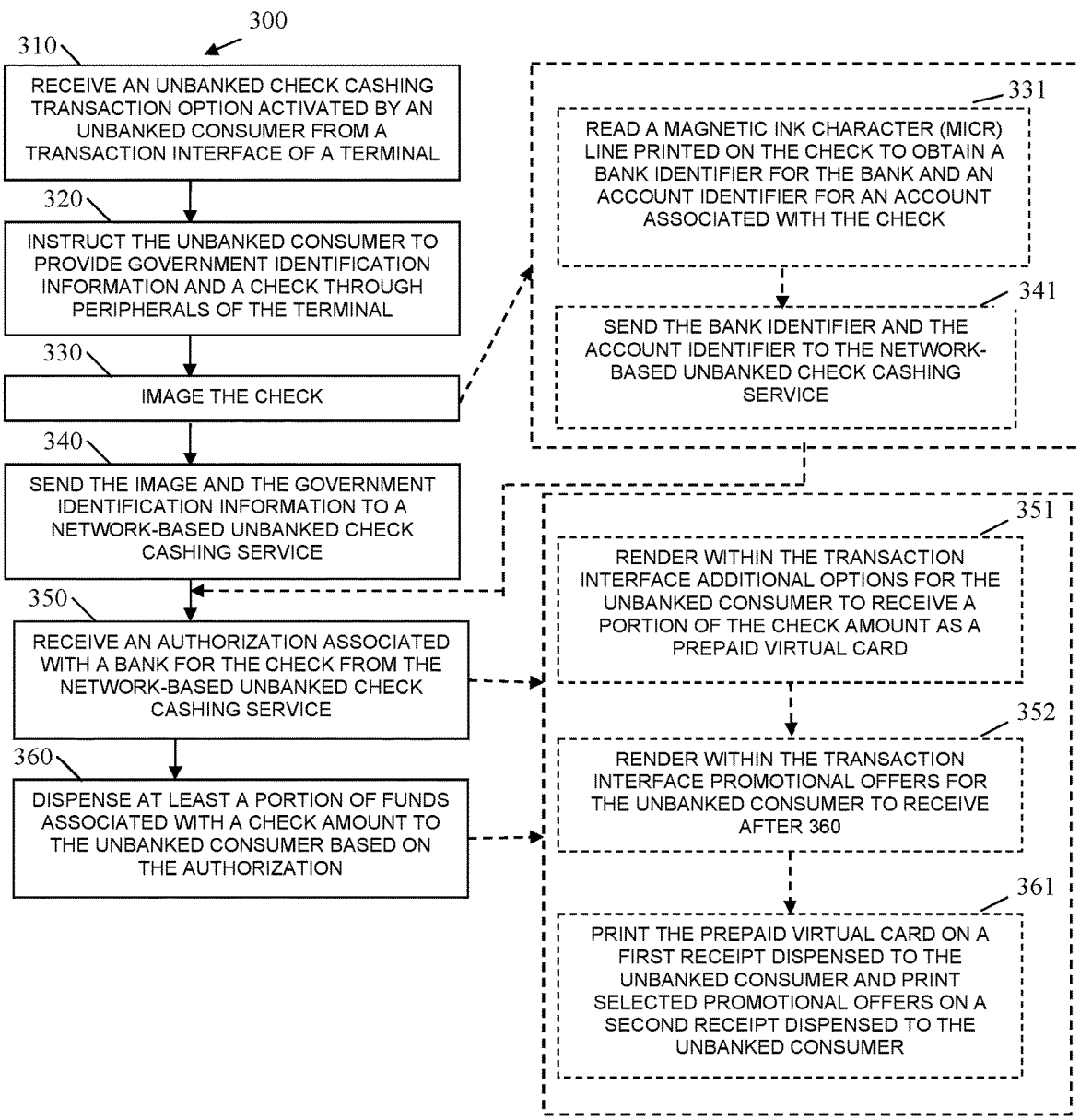
FIG. 3 is a diagram of another method for terminal enabled unbanked check processing, according to an example embodiment.

FIG. 3 is a diagram of another method 300 for terminal enabled unbanked check processing, according to an example embodiment. The software module(s) that implements the method 300 is referred to as a "transaction manager." The transaction manager is implemented as executable instructions programmed and residing within memory and/or a non-transitory computer-readable (processor-readable) storage medium and executed by one or more hardware processors of one or more hardware devices. The processors of the devices that execute the transaction manager are specifically configured and programmed to process the transaction manager. The transaction manager has access to one or more networks during its processing. The networks can be wired, wireless, or a combination of wired and wireless.

In an embodiment, the device that executes the transaction manager is terminal 120. In an embodiment, the terminal 120 is an ATM, an SST, a POS terminal, or a kiosk. In an embodiment, the transaction manager is transaction manager 123. In an embodiment, the transaction manager interacts with method 200 in the manners discussed above with respect to system 100 and unbanked check cashing service 113 and transaction manager 123.

At 310, the transaction manager receives an unbanked check cashing transaction option activated by an unbanked consumer from a transaction interface of the terminal 120. This initiates an enhanced workflow for processing by the terminal 120.

At 320, the transaction manager instructs the unbanked consumer to provide government identification information and to provide a check through peripherals of the terminal 120. The identification information can be entered by the consumer through the transaction interface and/or provided by inserting a government issued card into a card reader peripheral of the terminal 120 or by scanning a QR code by a scanner peripheral of the terminal 120. The check is provided through a media depository infeed of a media depository peripheral of the terminal 120.

At 330, the transaction manager images the check. The transaction manager media depository peripheral device can also perform a variety of image verification checks on the check, such as whether the check is endorsed, etc.

In an embodiment, at 331, the transaction manager reads a MICR line printed on the check to obtain a bank identifier for a bank that the check is drawn on and an account identifier for an account associated with the check. A routing number in the MICR line identifies the bank and correspondingly the bank's server or host server 140 to contact the bank's check verifier service 143.

At 340, the transaction manager sends the image and the government identification information to a network-based unbanked check cashing service. In an embodiment, the network-based unbanked check cashing service is method 200 and/or service 113.

In an embodiment of 331 and 340, at 341, the transaction manager sends the bank identifier or routing number and the account identifier to the network-based unbanked check cashing service 200/113. When this embodiment occurs, the service does not have to read the MICR line from the image of the check or can verify the MICR line from the image with the MICR information provided by the transaction manager.

At 350, the transaction manager receives an authorization associated with a bank for the check from the network-based unbanked check cashing service 200/113. The authorization is retained in a ledger by the transaction manager for compliance and any attempted repudiation by the bank that the check was unauthorized to be cashed at the terminal 120.

In an embodiment, at 351, the transaction manager renders within the transaction interface additional options for the unbanked consumer to receive a portion of the check amount as a prepaid virtual card. In an embodiment of 351 and at 352, the transaction manager renders within the transaction interface promotional offers for the unbanked consumer to receive after 360.

At 360, the transaction manager dispenses at least a portion of funds associated with a check amount to the unbanked consumer based on the authorization received at 350. In an embodiment of 352 and 360, at 361, the transaction manager prints any prepaid virtual card selected by the consumer at 351 on first receipt dispensed to the unbanked consumer and prints any selected promotional offers on a second receipt dispensed to the unbanked consumer.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
  receiving government card information associated with a government issued identification card of an unbanked consumer from a terminal;
  receiving an image of a check from the terminal;
  verifying the government card information with a government verification service;
  verifying a first name on the check obtained from the image matches a second name associated with the government card information;
  obtaining a bank identifier of a bank, an account identifier for an account of the check, and a check amount using at least the image;
  sending the account identifier and the check amount to the bank using the bank identifier;
  obtaining an authorization to cash the check from the bank;
  providing the authorization to the terminal to cash the check of the unbanked consumer at the terminal;
  processing the method as an enhanced workflow to an existing check cashing workflow associated with the terminal, wherein the enhanced workflow is initiated when the unbanked consumer selects an unbanked check cashing option through a transaction interface of the terminal causing the terminal to provide the government card information and the image; and
  causing media cassettes of the terminal to store the check in a check cassette bin of the terminal and dispense currency in the amount of the check to the unbanked consumer at the terminal.

2. The method of claim 1, wherein receiving the government card information further receiving the government card information from the terminal after the terminal reads a card inserted into a card reader of the terminal or scanned by a scanner of the terminal.

3. The method of claim 1, wherein receiving the government card information further includes receiving the government card information as an identifier entered by the unbanked consumer through the transaction interface of the terminal.

4. The method of claim 1, wherein receiving the image further includes receiving magnetic ink character recognition (MICR) information with the image from the terminal, wherein the terminal reads a MICR line printed on the check when the unbanked consumer enters that check through a media infeed of the terminal.

5. The method of claim 4, wherein receiving the MICR information further includes identifying the bank identifier and the account identifier from the MICR information.

6. The method of claim 5, wherein receiving the image further includes receiving a front image of the check and receiving a back image of the check from the terminal after the unbanked consumer enters the check through the media infeed of the terminal.

7. The method of claim 1, verifying the government card information further includes identifying a government entity and the government verification service from the government card information and sending the government card information for verification to the government verification service.

8. The method of claim 1, wherein verifying the first name further includes obtaining the second name from the government verification service.

9. The method of claim 1, obtaining the bank identifier further includes identifying the bank identifier and the account identifier from the image in a magnetic ink character recognition (MICR) line printed on the check and identified from the image.

10. The method of claim 1, wherein providing further includes providing an identity verification for the unbanked consumer to the terminal based on the verifying of the government card information and the verifying of the first name to the second name.

11. A system comprising:
- at least one server that comprises at least one server processor;
- a terminal that comprises at least one terminal processor;
- the at least one terminal processor executes first instructions that cause the at least one terminal processor to perform first operations comprising:
- receiving an unbanked check cashing option from a transaction interface that is selected by an unbanked consumer to cash a check at the terminal;
- obtaining government issued identification information for a government card associated with the unbanked consumer;
- reading a magnetic ink character recognition (MICR) line printed on the check to obtain a bank identifier for a bank associated with the check and an account identifier for an account associated with the check;
- sending the government issued identification information, the bank identifier, the account identifier, and an image of the check to the server;
- receiving an authorization to dispense an amount of the check provided by the bank through the server;
- causing media peripherals of the terminal to store the check in a check cassette bin of the terminal;
- causing a media depository of the terminal to dispense currency for at least a portion of the amount based on the authorization;
- processing the first operations as an enhanced workflow to an existing check cashing workflow associated with the terminal, wherein the enhanced workflow is initiated when the unbanked consumer selects the unbanked check cashing option through the transaction interface of the terminal causing the terminal to provide the government issued identification information and the image to initiate the enhanced workflow; and
- the at least one server processor executes second instructions that cause the at least one server processor to perform second operations comprising:
- receiving the government issued identification information, the bank identifier, the account identifier, and the image from the terminal;
- verifying the government issued identification information with a government verification service;
- verifying a first name of a payee in the image of the check matches a second name of the payee provided by the government verification service;
- determining the amount of the check from the image;
- sending the account identifier and the amount to a bank server associated with the bank based on the bank identifier;
- receiving the authorization from the bank server; and
- sending the authorization and the amount to the terminal.

12. The system of claim 11, wherein the terminal is an automated teller machine, a self-service terminal, a point-of-sale terminal, or a kiosk.

\* \* \* \* \*